United States Patent [19]

Tabaroni et al.

[11] Patent Number: 5,669,208

[45] Date of Patent: Sep. 23, 1997

[54] PACKAGING

[75] Inventors: Roberto Tabaroni, Bologna; Andrea Bartoli, Reggio Emilia, both of Italy

[73] Assignee: Unifill S.p.A., Modena, Italy

[21] Appl. No.: 500,514

[22] Filed: Jul. 11, 1995

[30] Foreign Application Priority Data

Jul. 12, 1994 [IT] Italy .................. MO94A0105

[51] Int. Cl.$^6$ .................. B65B 7/00; B65B 47/00
[52] U.S. Cl. .................. 53/453; 53/133.1; 53/468; 53/559; 141/348
[58] Field of Search .................. 53/453, 559, 424, 53/410, 468, 96, 133.1, 133.2, 266.1, 473, 457, 459, 381.1; 141/348, 349, 350, 346, 10, 114, 313

[56] References Cited

U.S. PATENT DOCUMENTS

| | | | |
|---|---|---|---|
| 2,813,799 | 11/1957 | Bender et al. | 53/453 |
| 3,092,940 | 6/1963 | David | 53/453 |
| 4,132,334 | 1/1979 | Danks | 141/348 X |
| 4,760,933 | 8/1988 | Christner et al. | 141/350 X |
| 4,907,394 | 3/1990 | Tschepke et al. | 53/133.1 X |
| 4,924,923 | 5/1990 | Boehmer et al. | 141/350 X |
| 5,465,767 | 11/1995 | Harms et al. | 53/133.2 X |

FOREIGN PATENT DOCUMENTS

| | | |
|---|---|---|
| 69257/74 | 11/1975 | Australia . |
| 0326743 | 8/1989 | European Pat. Off. . |
| 0479152A2 | 9/1991 | European Pat. Off. . |
| 0463658 | 1/1992 | European Pat. Off. . |
| WO94/08852 | 4/1994 | WIPO . |

*Primary Examiner*—James F. Coan
*Attorney, Agent, or Firm*—Reising, Ethington, Barnard & Perry, PLLC

[57] ABSTRACT

A container or group of containers formed in thermoformable and heat-weldable material and including an inlet having inlet wall portions which are elastic so that the inlet is self-closing prior to permanent sealing. A blow-molding system for the manufacture of such containers or group of containers includes a forming station for forming a group of containers with respective inlets or a group of containers with a common inlet. A filling station is located downstream of the forming station.

32 Claims, 7 Drawing Sheets

PACKAGING

BACKGROUND OF THE INVENTION

1. Technical Field

This invention relates generally to a packaging method, a packaging apparatus and a packaging container, and, more particularly, to a packaging system which is carried out under hygienic conditions.

2. Background Art

In conventional blow moulding systems, closed container are obtained which are possibly placed in storage and subsequently opened and filled in an at least aseptic environment, particularly a sterile environment.

This type of system, however, takes up a great deal of space, primarily because of the need to provide large volumes to receive the closed containers and complex and expensive devices to transfer them to the sterile zone where they are opened and filled.

Moreover, there is the possibility that during their closure and/or opening and/or transfer, the containers may be contaminated by polluting particles present in the environment, thereby compromising hygiene.

Finally, the opening and filling operation implies a considerable increase in costs and considerable complexity of the system.

EP-B-0479152 discloses a blow-moulding system in which advancement clamps move two mutually facing films along a path on which the following are arranged in sequence: two welding half-moulds, which by mutually welding the two films in preset regions define the outlines of containers which are open toward a longitudinal edge of the films; two half-moulds for heating the welded films and a container-forming station. Air injection nozzles, inserted between two edge flaps at that longitudinal edge of the films, and two forming half-moulds, in which container-forming cavities are provided, operate in the forming station. Divaricators for divaricating the two flaps are provided proximate to the forming station so as to facilitate the insertion of the air injection nozzles.

The containers are filled by injecting a product through an open inlet of each container, the inlets being then closed by heat-welding.

At the forming station, the external surfaces of the air injection nozzles define the internal surfaces of the inlets and these remain open until after the containers have been filled and thus the interiors of the containers remain accessible to any contaminants present.

In the event that the formed containers are transported to other premises for filling, the risk of contamination of their interiors greatly increases.

Such prior art could be considerably improved with a view to eliminating its various drawbacks.

SUMMARY OF THE INVENTION

One of the aims of the present invention is to provide a packaging system in which the packaging can be carried out under more hygienic conditions.

According to a first aspect of the present invention, there is provided a packaging method, comprising providing a container including an inlet, or a group of containers including a common inlet, inlet wall portions which are elastic so that the inlet is self-closing, injecting product into the interior(s) of the container(s) through the inlet while said inlet wall portions are elastically pushed apart and, following filling of the container(s), allowing said inlet wall portions to come together to close said inlet.

According to a second aspect of the present invention, there is provided a packaging apparatus for use in filling of a container or a group of containers including inlet wall portions which are elastic so that an inlet of the container or group is self-closing, comprising product-injecting means insertable between said inlet wall portions to push said inlet wall portions apart elastically, serving to inject a product into the interior(s) of the container(s) and retractable from between said inlet wall portions to allow said inlet wall portions to come together to close said inlet.

According to a third aspect of the present invention, there is provided a container, or a group of containers, having an inlet comprising inlet wall portions which are elastic so that the inlet is self-closing, the arrangement being such that injecting means is insertable between said inlet wall portions to push said inlet portions apart elastically.

Owing to the invention, it is possible to reduce the risk of contamination of the interiors of containers.

In a preferred embodiment, a system for blow-moulding containers and filling them, particularly in a sterile environment, comprises a forming, i. e. molding, station having blow-moulding devices, means for supplying a pair of webs of thermoformable and heat weldable material to the moulding station, conveying means to remove the containers from the moulding station and advance the containers, a filling station which has injector devices and to which the conveying means advances the containers, and sealing means for permanently sealing the filled containers, the moulding station having devices to prevent heat-welding the webs together at a predetermined longitudinal edge zone of the webs and there to shape elastic closing portions that enable the containers to be penetrated by tubes for the injection of the product in a sterile environment downstream of the moulding station.

In this way it becomes possible to fill the containers in an aseptic manner during the manufacturing cycle of the containers themselves and consequently with a considerable improvement in the hygiene conditions.

It is to be noted that the system is suitable for filling of all product types, particularly for products that require special care, for example foodstuffs and pharmaceuticals.

The containers, blow-moulded by the injection of preferably filtered air and using heated dies, are extracted from the forming station in a closed configuration, the elastic closing portions preventing the entry of polluting substances through the inlets of the containers, and introduced into a sterile environment, in which they are immediately filled by forcing open the said elastic closing portions.

In a particularly advantageous version, the said devices that prevent the heat welding of the webs can consist, very simply and economically, of mould inserts which are thermally non-conductive and bound the longitudinal edge zone of the sheets.

The said devices that prevent the heat welding of the webs may include external surfaces of at least one injector unit for the forming fluid and positioned between the pair of webs in the zone in question: the said injector unit preferably having a longitudinal feed bore for the forming fluid communicating, by means of a number of transverse bores, with a conduit for the supply of the forming fluid to the containers.

The said devices for preventing heat-welding of the webs can also include a spacer positioned between the pair of webs in a mould of the moulding station.

The injector unit and/or the spacer may have converging inside edges to form outwardly diverging side walls of a channel, to provide a guide for the introduction of the tubes for injecting the product through the inlets of the containers.

This makes the introduction of the tubes into the containers in order to fill them particularly simple in either a normal or a sterile environment.

The side walls of the channel can be considered as included in the elastic closing portions of the inlets of the containers and are non-welded edge portions of the pair of sheets.

It possible to obtain particularly high levels of productivity if the elastic closing portions are formed at the same time as the corresponding containers.

In one version, said elastic closing portions press together elastically at the inlet of each container obtained by an interruption in a weld extending around the container.

In an alternative version, the elastic closing portions also define a conduit extending along the sheets, the conduit at one side interconnecting the mouths of a group of the containers and at the other side being closed by the elastic colsing portions.

The elastic closing portions may serve as elastic hinges during the introduction of the product-injecting tubes.

It is particularly advantageous if separator elements coupled to corresponding activating devices act on the channel side walls to separate them so as to enable the tubes to be inserted into the mouths of the group of containers.

This facilitates the introduction of the tubes into the mouths, causing an elastic deformation of the conduit interconnecting the mouths, prior to the insertion of the tubes into the channel and conduit themselves.

Said separator elements can be a pair of prismatic separator elements with tapering ends positioned both ahead of and after each tube.

This enables a considerable elastic deformation of the walls of the conduit interconnecting the mouths of containers of the same group for the insertion of large tubes.

Alternatively, the said separator elements can consist of tubular separators with tapered lower extremities and in which the tubes can be made to slide axially.

This enables the tube to be inserted particularly quickly.

It is to be noted that, in order to achieve the moulding of the containers with a particularly high level of productivity, the moulding station can advantageously define for the containers axes which are substantially perpendicular to the direction of advance of the sheets, the inlets of the said containers pointing towards one of the longitudinal edges of the said pair of sheets.

This offers the particular advantage of enabling the rationalization of the dimensions of the apparatus.

In a further advantageous version the apparatus includes a forming station for forming two parallel rows of containers having inlets pointing towards the respective longitudinal edges of the pair of webs and two consecutive filling stations, between which there is a device for rotating the groups of containers around a horizontal axis.

This enables the production capacity to be doubled with a limited increase in the cost of the apparatus.

BRIEF DESCRIPTION OF THE DRAWINGS

In order that the invention may be clearly understood and readily carried into effect, reference will now be made, by way of example, to the drawings attached in which.

DESCRIPTION OF THE PREFERRED EMBODIMENT

Referring to the drawings, a machine 1 for moulding containers 2 in thermo-formable and heat-weldable material, comprises a container-forming station 3, of the type described in international patent application publication WO 94/08852: a preferred embodiment of the said station being described later.

Figure 1:
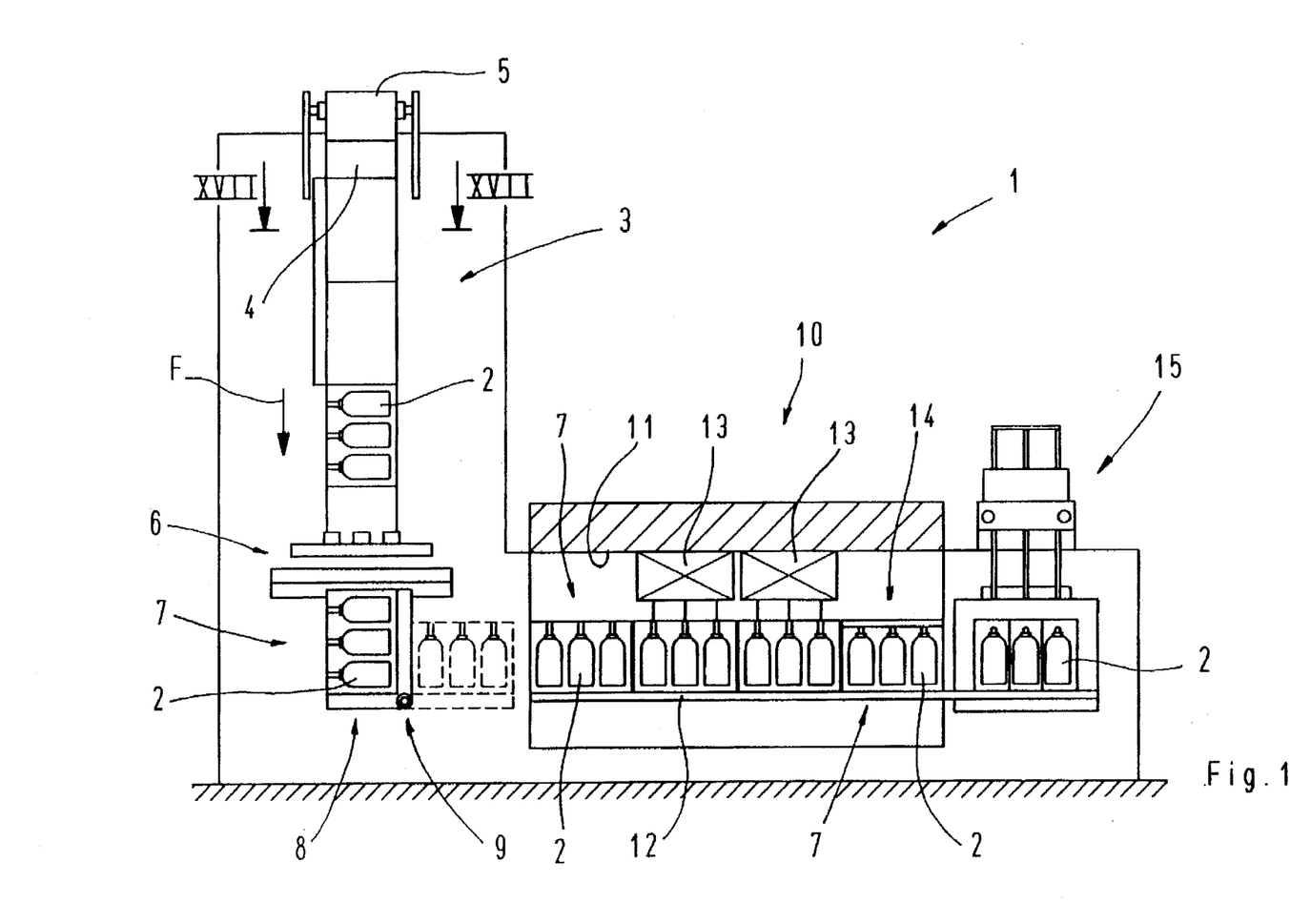
FIG. 1 is a side view of a packaging apparatus with groups of containers aligned in single rows.
Figure 2:
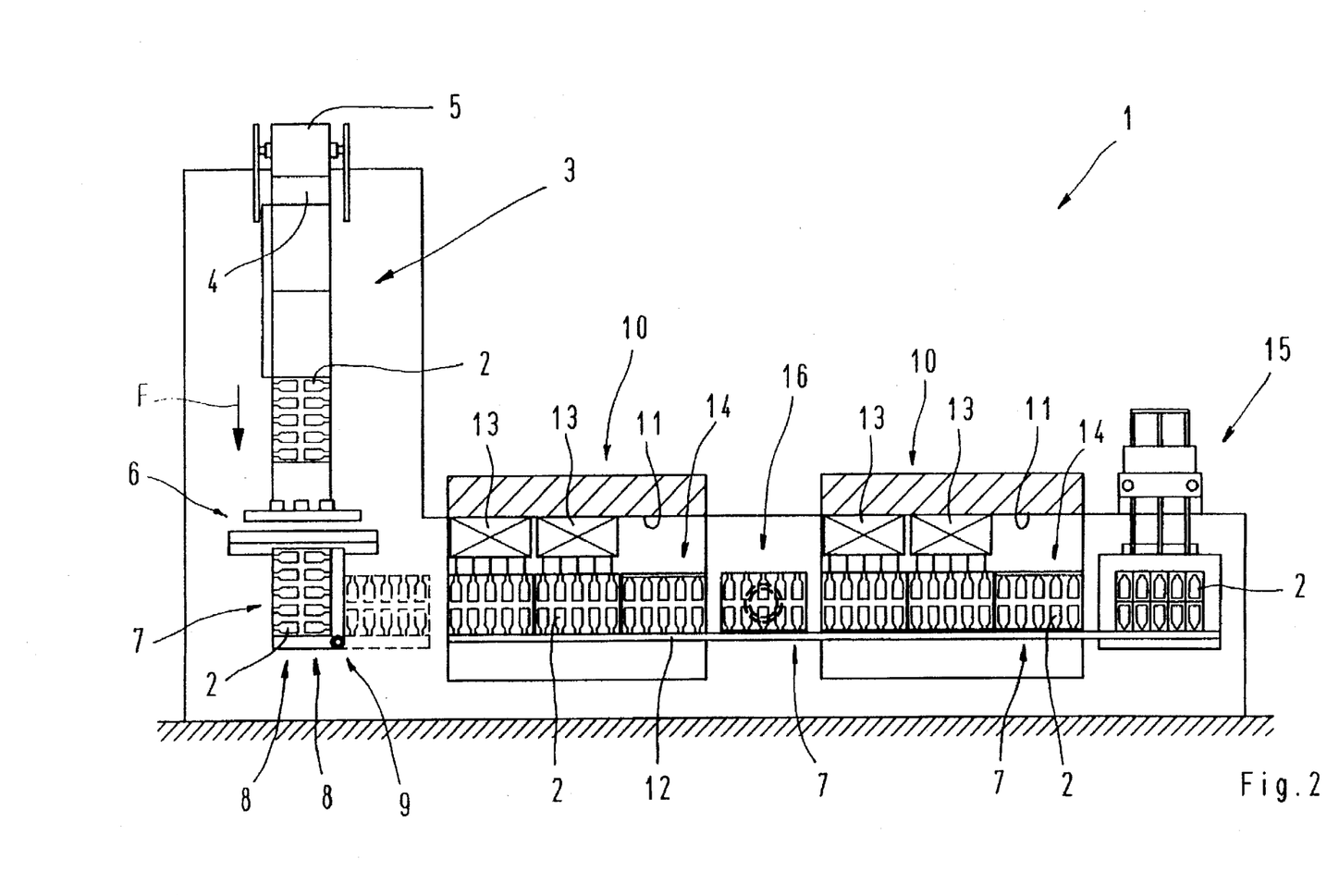
FIG. 2 is a side view as in FIG. 1, but in a variant with the containers aligned in double rows.
Figure 3:
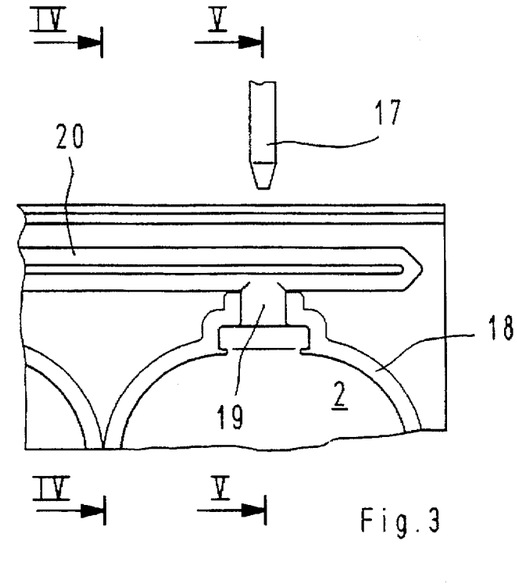
FIG. 3 is a side view of a device for injecting product into a container in the apparatus of FIGS. 1 or 2.
Figure 4:
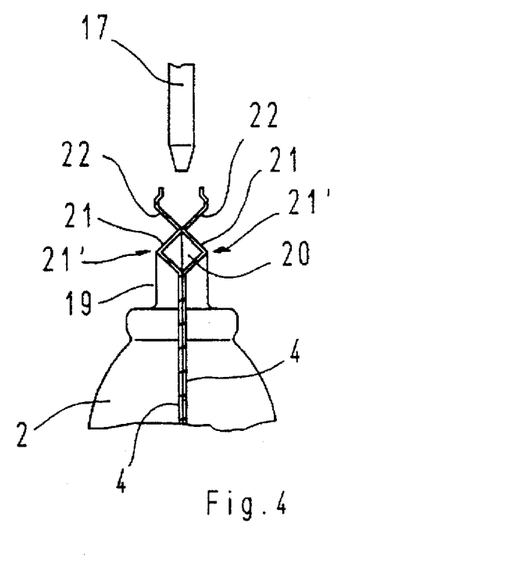
FIG. 4 is a section taken along IV—IV of FIG. 3.

The forming station 3 is supplied with a pair of webs 4, unwound from corresponding rolls 5, of thermoformable and heat weldable material; downstream of forming station 3, there is a shearing station 6, in which the pair of webs 4, having already been shaped to include containers 2 formed in them, are cut along transverse planes so as to form groups 7 of containers each containing a row 8 of containers 2, or even two rows 8 of containers as illustrated in FIG. 2.

Downstream of shearing station 6, there can be a positioning station 9, of the groups 7, preferably consisting of a device that rotates through set angles bringing about, for example, a rotation of 90° of the groups 7, turning them from their vertical path through the forming station 3 and shearing station 6 to a horizontal path towards subsequent filling stations 10.

The pair of webs 4 is made to index, by advancing means not shown that operate in conjunction with rolls 5, in the direction indicated by arrow F: said advancing means also performing the extraction of containers 2 from forming station 3.

Each filling station is contained in an at least aseptic (in this case sterile) environment delimited by a casing 11, inside which gaseous sterilizing or disinfecting fluid is introduced at a pressure higher than atmospheric pressure, the casing being crossed by a conveyor line 12 for the groups 7 of containers 2.

Inside the casing there are injection devices 13 for the product and sealing devices 14, that heat-weld the spouts of containers 2 of each group 7, after they have been filled with the product: in this way the containers can be filled and sealed immediately downstream of the forming station 3, and this in a sterile environment.

Having exited from casing 11, the groups 7 at some point arrive at a punching station 15 to separate containers 2, in correspondence with their external profile, from the webs 4 of each group 7.

As shown in FIG. 2, in the case of a machine whereby, in order to increase productivity, the groups 7 contain two rows of containers 8 parallel and opposite, with the inlets pointing towards opposite sides of the same group, there are two filling stations 10 between which there is an overturning device 16 that rotates the groups 7 around a horizontal axis: the overturning device 16 being such as to lower the row 8 of filled and sealed containers 2 and at the same time to raise the row of containers not filled in the preceding station 10: the overturning device possibly consisting advantageously of a rotatable frame having pincers to grip the groups 7 in turn.

To optimize the overall dimensions of the machine, the containers 2 are formed in the forming station 3 with their respective longitudinal axes lying horizontally so that, downstream of the positioning station 9, their axes are aligned vertically in the correct position for the insertion of the injection tubes 17 of the injection devices 13.

Figure 5:
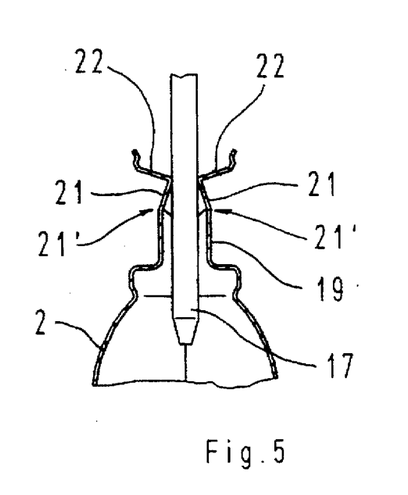
FIG. 5 is a section taken along V—V of FIG. 3, but with the injection tube inserted.
Figure 6:
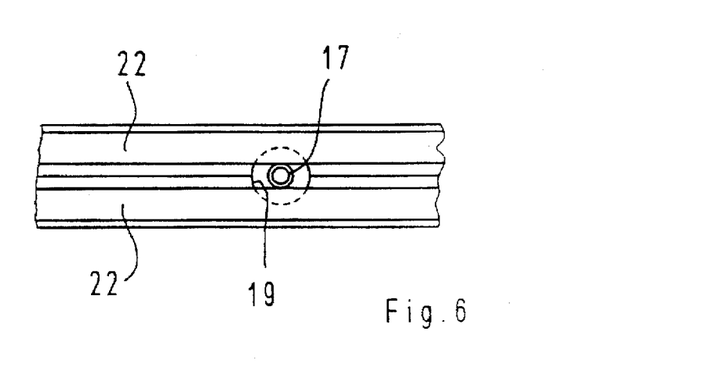
FIG. 6 is the top view of FIG. 5.

It is to be noted that the containers 2 exit from the forming station 3 with the peripheral weld 18 between webs 4, interrupted at the filling spouts 19 of the containers: in the area of the interruption in the weld 18, the webs are only placed one against the other so that they can be separated elastically in a simple manner by the introduction of the injection tube 17 into container 2 as illustrated in FIG. 5, carried out by actuator devices not shown.

To facilitate the insertion of each tube 17 in the corresponding container, the spouts 19 of containers 2 in the same row 8 advantageously intercommunicate via a conduit 20, having a section defined by corrugations 21 including flaps 22, folded in opposing "Z" shapes: the vertex of a "V" section of each corrugation 21 bearing against the vertex of the corresponding "V" section of the opposite corrugation 21 to close the inlet provided by the spouts 19 and the conduit 20: said corrugation 21 constituting elastic closing portions of the inlet 19, 20.

The external flaps 22 diverge outwards to facilitate the insertion of the tube 17 in the inlet 19, 20.

The outer vertices 21' of the corrugation 21 constitute respective elastic hinges to facilitate opening the zone of contact between the opposing inner vertices of corrugations 21, by the insertion of the tubes 17 into the containers.

To further facilitate the insertion of the tube 17 in the inlet 19, 20 there can be separator devices aligned with the conduit 20.

Figure 7:
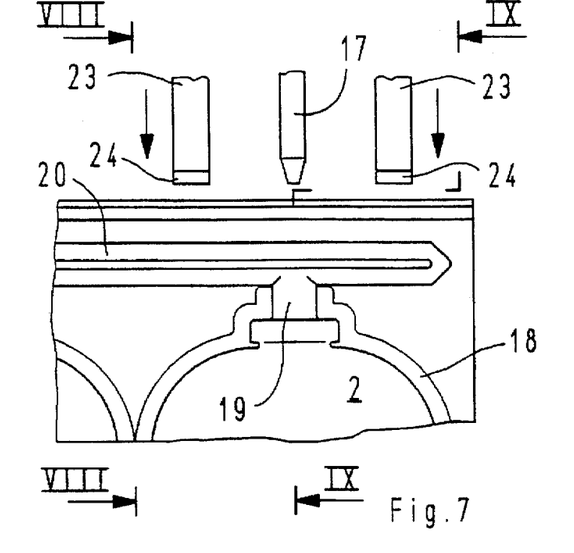
FIGS. 7, 8, 9 and 10 correspond respectively to FIGS. 3, 4, 5 and 6 but in relation to versions of the injection device having separator elements for a conduit interconnecting the mouths (in the form of spouts) of the containers.
Figure 8:
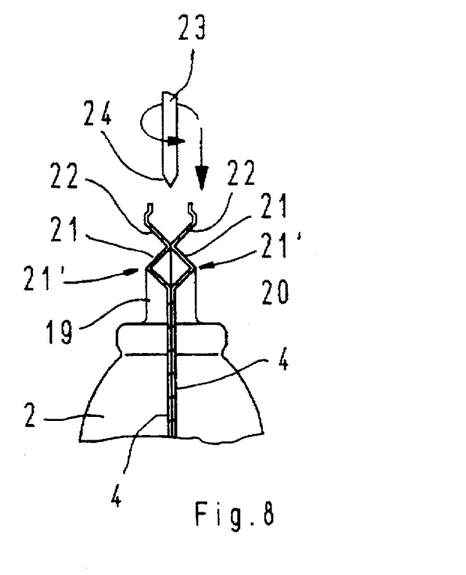
Figure 9:
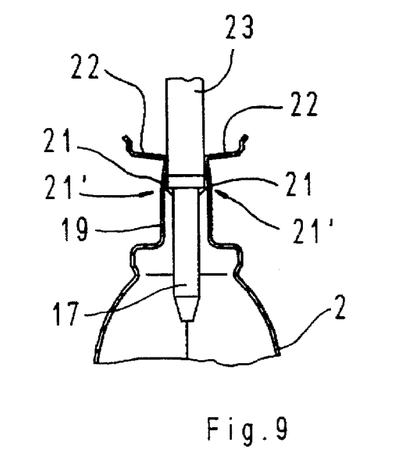
Figure 10:
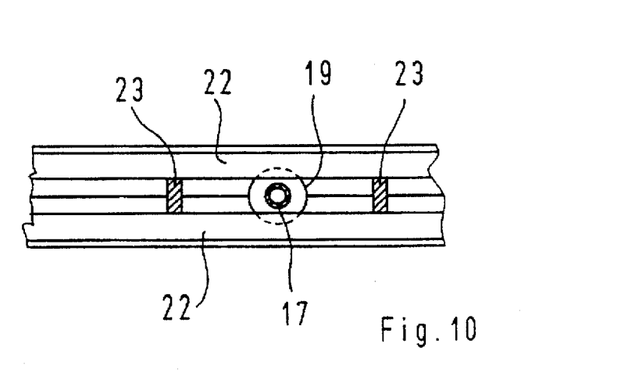

The said separator devices preferably consist of a pair of prismatic separator elements 23 (FIG. 7), preferably having tapered extremities 24, positioned ahead of and after each tube 17 and, therefore, of the corresponding spout 19 of the corresponding container 2, coupled to vertically and rotationally actuating devices for their insertion, and then turning, between the corrugations 21.

Figure 11:
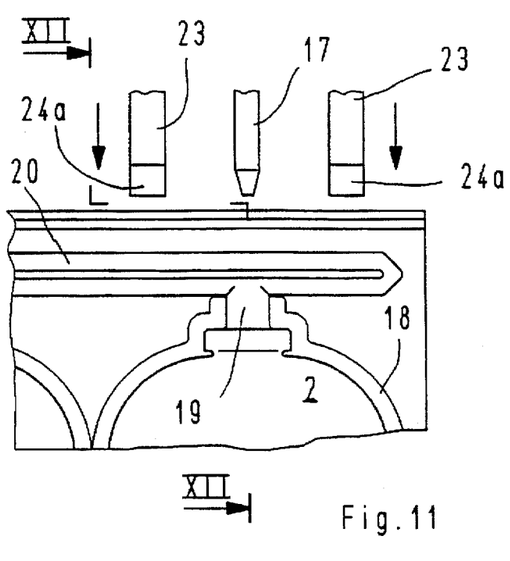
FIGS. 11 and 12 correspond respectively to FIGS. 7 and 9, but show another variation.
Figure 12:
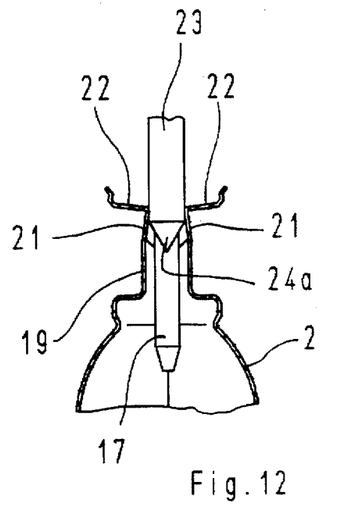

In a further version, shown in FIG. 11, said prismatic separator elements 23 are coupled only to vertically actuating devices, the corresponding tapered extremities 24a being sufficiently wide to separate corrugations 21 by axial insertion.

Figure 13:
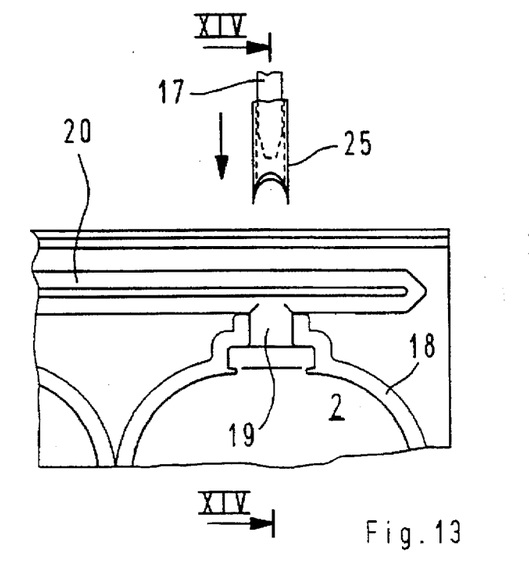
FIGS. 13 and 14 correspond to FIGS. 11 and 12, but show a telescopic variation.
Figure 14:
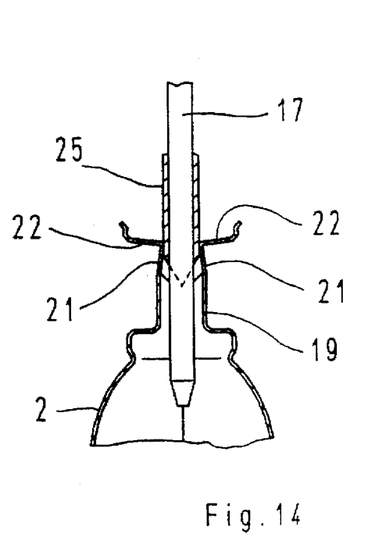

Alternatively, each separator device can consist of a tubular separator element 25 (FIG. 13) slidable axially and having a tapered lower extremity 26 inside which slides the injection tube 17.

Figure 15:
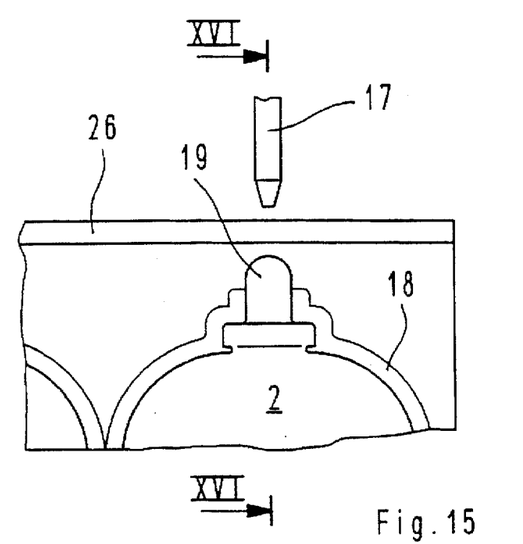
FIGS. 15 and 16 correspond to FIGS. 3 and 4, but in a variant of the elastic closing portions of the container.
Figure 16:
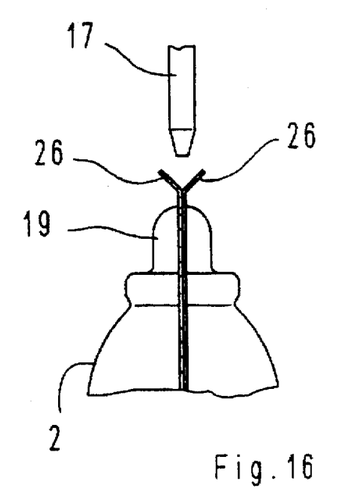
Figure 17:
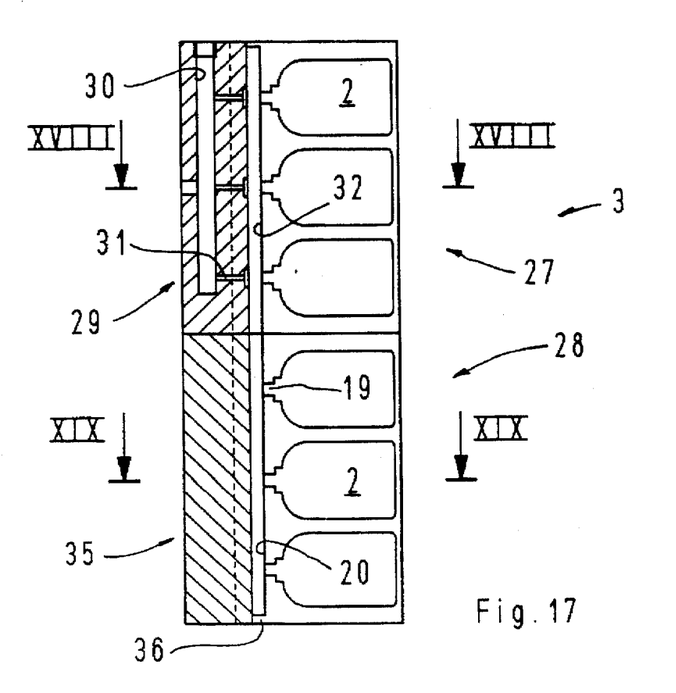
FIG. 17 is a longitudinal section of a forming station showing the arrangement of injection channels for the forming fluid, preferably compressed air.
Figure 18:
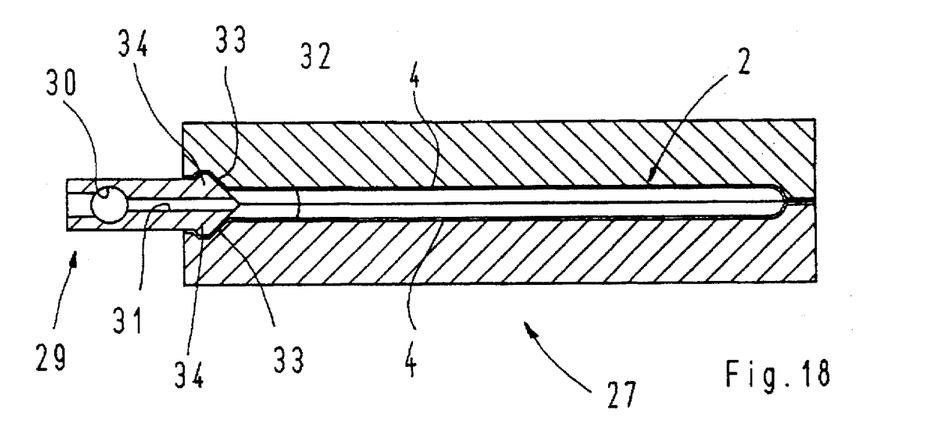
FIG. 18 is a section taken along line XVIII—XVIII of FIG. 17.
Figure 19:
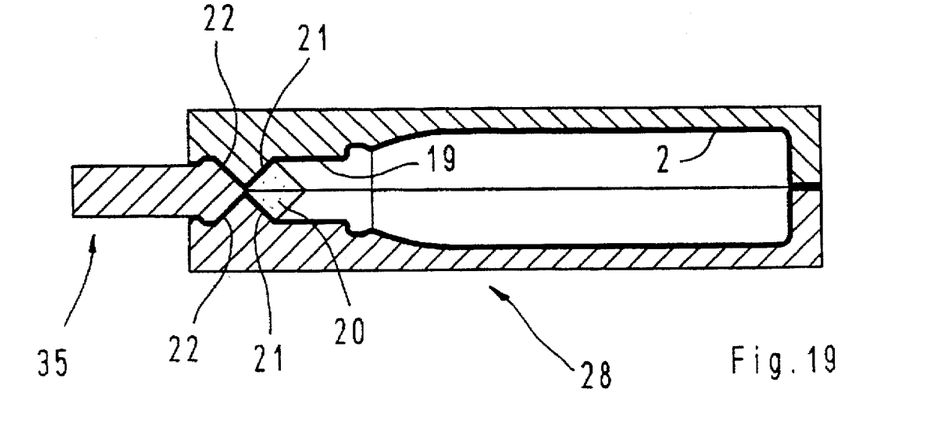
FIG. 19 is a section taken along line XIX—XIX of FIG. 17.

In the version of FIGS. 15 and 16, the inlets 19 of the containers in the same row 8 stop short of a single pair of flaps 26 diverging outward, the web portions between the spouts 19 on the one hand, and the flaps 26 on the other end, constituting elastic closing portions for the containers themselves: the said pair of diverging flaps 26 being obtained in the mould by means of inserts made of thermally non-conductive and refractory material surrounding the part of the container 2 around the upper extremity of spout 19.

In order to obtain each conduit 20 connecting the spouts of the containers 2 of the same row, the mould for the blow-moulding of the containers 2 in the corresponding station 3 is advantageously divided into a die 27 for pre-forming and welding the edges of the container 2 and a die 28 for finialising the shape of the container downstream of the preceding die.

The preforming and edge welding die 27, internally heated, has an injector unit 29 extending parallel to the direction F inserted between the webs 4 and having a longitudinal closed bore 30 for the supply of compressed air communicating by means of a number of transverse bores 31 with a conduit 32 for supplying forming fluid supplying each container 2.

The internal edge of the injector unit 29 has a pair of faces 33 converging towards the inside of the preforming and edge welding die 27, that form the external flaps 22; the said internal edge having longitudinal ribs 34 co-operating with respective grooves in respective halves of die 27, to prevent transverse sliding of the pair of webs 4 during the forming phase.

The following shape-finalizing die 28 for the containers 2 is cooled to keep it at a temperature depending on the material on which the webs 4 are made and is made to co-operate with a spacer 35, aligned with the injector unit 29 and having a corresponding external cross-section, but without internal holes: said spacer has the function of preventing air from escaping from inside the containers 2, through the non-welded stretch of the conduit 20, this being advantageously obtained by the extension of conduit 32 and communicates with it to enable the introduction of compressed air to form each container 2.

It is to be noted that the conduit 20 can be obtained, although less advantageously as regards stretching the material, even in the body of the preforming die 27, replacing the conduit 32, taking on in this case the function of distributing air to the containers 2 also in the preforming die 27.

By means of the pressing action of the die 28 (27) at location 36, the trailing end of the conduit 20 of a leading group 7 and the leading end of the conduit 20 of the next group 7 are permanently sealed, thereby enabling the insides of the containers in the group to be isolated from the outside environment.

What is claimed is:

1. A packaging method comprising the steps of (a) providing a container including an inlet, or a group of containers including a common inlet, inlet wall portions which are disposed opposite each other and which are elastic so that the inlet is self-closing, (b) injecting product into the interior (s) of the container(s) through the inlet while said inlet wall portions are elastically pushed apart, and (c) following filling of the container(s), allowing said inlet wall portions to come together elastically to close said inlet.

2. A method according to claim 1, wherein the step of providing containers(s) comprises forming said container(s) by heat-welding together and thermo-forming a pair of webs of material, while avoiding heat-welding together of said inlet wall portions.

3. A method according to claim 2, wherein said forming step takes place at a forming station ahead of a filling station at which said filling step takes place.

4. A method according to claim 1, wherein, following the coming together of said inlet wall portions to close said inlet, permanently sealing said inlet.

5. A method according to claim 1, wherein said steps are performed in an at least aseptic environment.

6. A method according to claim 1, wherein, immediately before and after the filling of the container or the group of containers, the corresponding inlet wall portions comprise respective portions at opposite sides of the inlet, and each of the respective portions is of substantially a V-shaped section in an axial plane, with the vertices of the respective portions pointing towards each other.

7. A method according to claim 6, wherein, immediately before and immediately after the filling of the container or the group of containers, said respective portions thereof are each of zig-zag section in an axial plane.

8. A method according to claim 2, wherein said forming step includes injecting a gaseous substance to form said group of containers by supplying said gaseous substance under pressure to a conduit which is bounded by the inlet wall portions of the group and interconnects mouths of the containers.

9. A method according to claim 1, wherein, before filling of the container or the group of containers, turning same about a substantially horizontal axis to bring the inlet thereof into an orientation in which the inlet is directed substantially vertically upwards.

10. A method according to claim 9, and further comprising, prior to filling of the container or the group with its inlet directed substantially vertically upwards: the steps of (d) providing another such container or another such group situated oppositely to the first-mentioned container or group, (e) filling the other container or group with its inlet directed substantially vertically upwards, (f) sealing the last-mentioned inlet, and (g) turning the containers about said substantially horizontal axis through two rightangles substantially.

11. Packaging apparatus for use in filling of a container or a group of containers including inlet wall portions which are elastic so that an inlet or the container or group is self-closing, said packaging apparatus comprising product-injecting means insertable between said inlet wall portions to push said inlet wall portions apart elastically, serving to inject a product into the interior(s) of the container(s) and retractable from between said inlet wall portions to allow said inlet wall portions to come together to close said inlet, and forming means which serves to heat-weld a pair of webs of thermoplastic material together around an outline of said container, or around respective outlines of the containers of said group, and to thermo-form said webs to provide walls of said container or of said containers of said group, and to shape said inlet wall portions.

12. Apparatus according to claim 11, and further comprising preventing means at said forming means and serving to prevent heat-welding together of said inlet wall portions.

13. Apparatus according to claim 11, and further comprising sealing means which serves to seal permanently together said inlet wall portions following the coming together of said inlet wall portions.

14. Apparatus according to claim 12, wherein said forming means is arranged to extend along respective adjacent edges of said webs and includes longitudinal surface portions serving to co-operate with longitudinal edge zones of said webs to define a conduit extending along said group and intercommunicating mouths of the containers of the group.

15. Apparatus according to claim 12, wherein said preventing means comprises mould inserts which are substantially non-conductive thermally.

16. Apparatus according to claim 12, wherein said forming means includes gaseous-substance-injecting means and said preventing means includes external surface portions of said gaseous-substance-injecting means.

17. Apparatus according to claim 14, wherein said forming means includes gaseous-substance-injecting means and moulding means after said gaseous-substance-injecting means, and said moulding means includes spacing means for spacing apart said adjacent longitudinal edge zones and serves to finalize the shape of the container(s).

18. Apparatus according to claim 17, wherein respective inside edges of said gaseous-substance-injecting means and said spacing means are aligned with each other and have substantially the same cross-sectional shape as each other.

19. Apparatus according to claim 16, wherein said gaseous-substance-injecting means has an inside edge intended to extend parallelly to the longitudinal edges of said webs.

20. Apparatus according to claim 17, wherein said spacing means has an inside edge intended to extend parallelly to the longitudinal edges of said webs.

21. Apparatus according to claim 18, 19, or 20, wherein the or each inside edge has a pair of faces converging towards each other.

22. Apparatus according to claim 19, wherein a pair of longitudinal ribs to limit transverse sliding of said webs is provided on said gaseous-substance-injecting means adjacent the inside edge thereof.

23. Apparatus according to claim 20, wherein a pair of longitudinal ribs to limit transverse sliding of said webs is provided on said spacing means adjacent the inside edge thereof.

24. Apparatus according to claim 17, wherein said moulding means is formed with recesses which promote formation between said webs adjacent said spacing means of a second conduit communicating with the first-mentioned conduit and with mouths of a group of containers at said moulding means.

25. Apparatus according to claim 11, and further comprising separator elements located before and after said injecting means and serving to maintain spaced apart adjacent longitudinal edges of said webs, said separator elements having respective tapered extremities.

26. Apparatus according to claim 25, wherein respective shanks of said separator elements are of oblong cross-section in the zones of said tapered extremities, said apparatus further comprising rotary driving means serving to rotate the separator elements about the respective longitudinal axes of said shanks.

27. Apparatus according to claim 11, and further comprising a separator element tubularly receiving said injecting means and serving to maintain spaced apart adjacent longitudinal edges of said webs, said separator element having a tapered extremity.

28. A container, or a group of containers, having an inlet comprising inlet wall portions which are disposed opposite each other and which are elastic so that the inlet is self-closing, the arrangement being such that injecting means is insertable between said inlet wall portions to push said inlet wall portions apart elastically.

29. A container or a group according to claim 28, wherein said inlet wall portions comprise respective portions at opposite sides of the inlet, and each of the respective portions is of substantially V-shaped section in an axial plane, with the vertices of the respective portions pointing towards each other.

30. A container or a group according to claim 29, wherein said respective portions are each of zig-zag section in said axial plane.

31. A combination comprising a pair of webs heat-welded to each other and thermo-formed to provide a row of containers each according to claim 28, mouths of the containers being directed towards one longitudinal edge of said pair of webs.

32. A combination according to claim 31, wherein respective longitudinal edge zones of said webs at said one longitudinal edge of said pair of webs bound a channel opening unilaterally outwardly of said pair of webs.

* * * * *